(12) United States Patent
Ferren et al.

(10) Patent No.: US 9,516,391 B2
(45) Date of Patent: Dec. 6, 2016

(54) TECHNIQUES FOR OBJECT BASED OPERATIONS

(75) Inventors: Bran Ferren, Beverly Hills, CA (US); Cory J. Booth, Beaverton, OR (US); Genevieve Bell, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 826 days.

(21) Appl. No.: 13/819,231

(22) PCT Filed: Aug. 25, 2011

(86) PCT No.: PCT/US2011/049197
§ 371 (c)(1),
(2), (4) Date: Aug. 20, 2013

(87) PCT Pub. No.: WO2012/027595
PCT Pub. Date: Mar. 1, 2012

(65) Prior Publication Data
US 2013/0321570 A1   Dec. 5, 2013

Related U.S. Application Data

(60) Provisional application No. 61/377,588, filed on Aug. 27, 2010.

(51) Int. Cl.
*H04N 13/00* (2006.01)
*H04N 21/63* (2011.01)
(Continued)

(52) U.S. Cl.
CPC .............. *H04N 21/632* (2013.01); *G01S 5/20* (2013.01); *G06F 3/017* (2013.01); *G06F 3/0346* (2013.01);
(Continued)

(58) Field of Classification Search
CPC .... G06Q 30/0201; G06F 3/041; G06F 3/0485;
G06F 3/048; G06F 3/0481; G06F 3/0346;
G06F 3/0482; G06F 3/0383; G06F 3/017;
H04L 65/403; H04N 5/4403; H04N 5/91;
H04N 21/4882; H04N 21/4532; H04N
21/654; H04N 5/44504; H04N 21/4312;
H04N 2005/44556; H04N 21/4755; H04N
21/8133; H04N 21/632; H04N
21/63; H04N 21/437; H04N
21/4147; H04N 21/4333; H04N 21/482;
H04N 21/4432; H04N 21/4436; H04N
21/42222; H04N 21/43615; G01S 5/20;
G06N 5/02; G08C 19/00; G08C
17/00; G08C 17/02; G08C 2201/32; G06K
9/3266
(Continued)

(56) References Cited

U.S. PATENT DOCUMENTS 6,757,906 B1   6/2004   Look et al.
7,206,029 B2   4/2007   Cohen-Solal
(Continued)

FOREIGN PATENT DOCUMENTS

JP   08-171628        7/1996
KR   10-2005-0015070  2/2005
(Continued)

OTHER PUBLICATIONS

Extended European Search Report received for European Patent Application No. 11820668.9, mailed Jan. 19, 2015 8 pages.
(Continued)

*Primary Examiner* — Allen Wong

(57) ABSTRACT

Techniques for object based operations may include identifying one or more objects in a multimedia stream. The one or more objects may be classified. An operation may be performed based on the classification of the one or more objects. Other embodiments are described and claimed.

25 Claims, 8 Drawing Sheets

(51) Int. Cl.

| | | |
|---|---|---|
| H04N 21/437 | (2011.01) | |
| G06F 3/041 | (2006.01) | |
| G06K 9/32 | (2006.01) | |
| H04N 5/445 | (2011.01) | |
| H04N 21/431 | (2011.01) | |
| H04N 21/654 | (2011.01) | |
| G08C 17/00 | (2006.01) | |
| G08C 17/02 | (2006.01) | |
| G08C 19/00 | (2006.01) | |
| G06F 3/048 | (2013.01) | |
| G06N 5/02 | (2006.01) | |
| G01S 5/20 | (2006.01) | |
| H04N 21/45 | (2011.01) | |
| H04N 21/488 | (2011.01) | |
| H04N 5/91 | (2006.01) | |
| H04N 5/44 | (2011.01) | |
| G06F 3/0485 | (2013.01) | |
| H04L 29/06 | (2006.01) | |
| G06Q 30/02 | (2012.01) | |
| H04N 21/436 | (2011.01) | |
| H04N 21/422 | (2011.01) | |
| H04N 21/443 | (2011.01) | |
| G06F 3/01 | (2006.01) | |
| G06F 3/038 | (2013.01) | |
| G06F 3/0482 | (2013.01) | |
| G06F 3/0481 | (2013.01) | |
| H04N 21/482 | (2011.01) | |
| G06F 3/0346 | (2013.01) | |
| H04N 21/4147 | (2011.01) | |
| H04N 21/433 | (2011.01) | |
| H04N 21/81 | (2011.01) | |
| H04N 21/475 | (2011.01) | |

(52) U.S. Cl.
CPC .............. *G06F 3/0383* (2013.01); *G06F 3/041* (2013.01); *G06F 3/048* (2013.01); *G06F 3/0414* (2013.01); *G06F 3/0481* (2013.01); *G06F 3/0482* (2013.01); *G06F 3/0485* (2013.01); *G06K 9/3266* (2013.01); *G06N 5/02* (2013.01); *G06Q 30/0201* (2013.01); *G08C 17/00* (2013.01); *G08C 17/02* (2013.01); *G08C 19/00* (2013.01); *H04L 65/403* (2013.01); *H04N 5/4403* (2013.01); *H04N 5/44504* (2013.01); *H04N 5/91* (2013.01); *H04N 21/4147* (2013.01); *H04N 21/42222* (2013.01); *H04N 21/437* (2013.01); *H04N 21/4312* (2013.01); *H04N 21/4333* (2013.01); *H04N 21/43615* (2013.01); *H04N 21/4432* (2013.01); *H04N 21/4436* (2013.01); *H04N 21/4532* (2013.01); *H04N 21/482* (2013.01); *H04N 21/4882* (2013.01); *H04N 21/63* (2013.01); *H04N 21/654* (2013.01); *G08C 2201/32* (2013.01); *G08C 2201/40* (2013.01); *H04N 21/4755* (2013.01); *H04N 21/8133* (2013.01); *H04N 2005/44556* (2013.01)

(58) Field of Classification Search
USPC ........................................................ 348/42
See application file for complete search history.

(56) References Cited

U.S. PATENT DOCUMENTS

| | | | |
|---|---|---|---|
| 2003/0028873 A1* | 2/2003 | Lemmons | H04N 7/17318 725/36 |
| 2003/0084445 A1 | 5/2003 | Pilat | |
| 2004/0252886 A1* | 12/2004 | Pan | G06K 9/342 382/173 |
| 2005/0002544 A1* | 1/2005 | Winter | G08G 1/14 382/104 |
| 2006/0085812 A1 | 4/2006 | Shishegar et al. | |
| 2007/0261003 A1 | 11/2007 | Reissmueller | |
| 2008/0253656 A1 | 10/2008 | Schwartzberg et al. | |
| 2009/0125544 A1 | 5/2009 | Brindley | |
| 2009/0213219 A1 | 8/2009 | Eggert et al. | |

FOREIGN PATENT DOCUMENTS

| | | | |
|---|---|---|---|
| WO | 0172040 | 9/2001 | |
| WO | WO 01/72040 A2 * | 9/2001 | ............ H04N 7/173 |
| WO | 2004090752 | 10/2004 | |

OTHER PUBLICATIONS

Office Action received for Japanese Patent Application No. 2013-526158, mailed Dec. 17, 2013, 13 pages including 5 pages English translation.

International Search Report and Written Opinion received for PCT Patent Application No. PCT/US2011/049197, mailed Apr. 9, 2012, 9 pages.

Haralick, et al., "Textural Features for Image Classifcation", IEEE Transactions on Systems, Man and Cybernetics, vol. SMC-3, No. 6, Nov. 1973, pp. 610-621.

Hoiem, et al., "Putting Objects in Perspective", Carnegie Mellon University, Robotics Institute, May 2007, 17 pages.

Schwartz, et al., "Human Detection Using Partial Least Squares Analysis", University of Maryland, prepared prior to Sep. 2009, 8 pages.

Zhu et al., "Fast Human Detection Using a Cascade of Histograms of Oriented Gradients", Proceedings of the 2006 IEEE Computer Society Conference on Computer Vision and Pattern Recognition (CVPR'06), Jun. 2006, 8 pages.

* cited by examiner

600

```
┌─────────────────────────────────────┐
│ IDENTIFY ONE OR MORE OBJECTS IN A   │
│           MULTIMEDIA STREAM         │
│                 602                 │
└─────────────────────────────────────┘
                   │
┌─────────────────────────────────────┐
│   CLASSIFY THE ONE OR MORE OBJECTS  │
│                 604                 │
└─────────────────────────────────────┘
                   │
┌─────────────────────────────────────┐
│ PERFORM AN OPERATION WITH A SECONDARY│
│  OBJECT BASED ON THE CLASSIFICATION OF│
│         THE ONE OR MORE OBJECTS     │
│                 606                 │
└─────────────────────────────────────┘
```

TECHNIQUES FOR OBJECT BASED OPERATIONS

RELATED APPLICATIONS

This application claims priority to U.S. Provisional Patent Application Ser. No. 61/377,588 filed Aug. 27, 2010, which is incorporated herein by reference in its entirety.

BACKGROUND

Current entertainment systems require a user to access television programming, the internet, and personal media in three separate interfaces. A user must access the various interfaces to obtain related information. For example, a user typically must go to a website on a computer interface in order to learn more about a particular actress on a television program or movie displayed on a television interface. As a result, a user must access various interfaces to obtain information.

When a user is able to access a different form of entertainment on the same interface, the various forms of entertainment do not allow a user to easily view multiple forms of entertainment within the same display. For example, a user can learn that he has e-mail while watching a television program on his computer. However, when a user wants to view the e-mail, the television program is either reduced in size or a portion of the program is blocked without regard for the program content being displayed. As there is no unified approach to the various forms of entertainment, a user must perform different functions on different devices.

Accordingly, there may be a need for improved techniques to solve these and other problems.

BRIEF DESCRIPTION OF THE DRAWINGS

FIG. 6 illustrates one embodiment of a logic flow.

DETAILED DESCRIPTION

Figure 1:
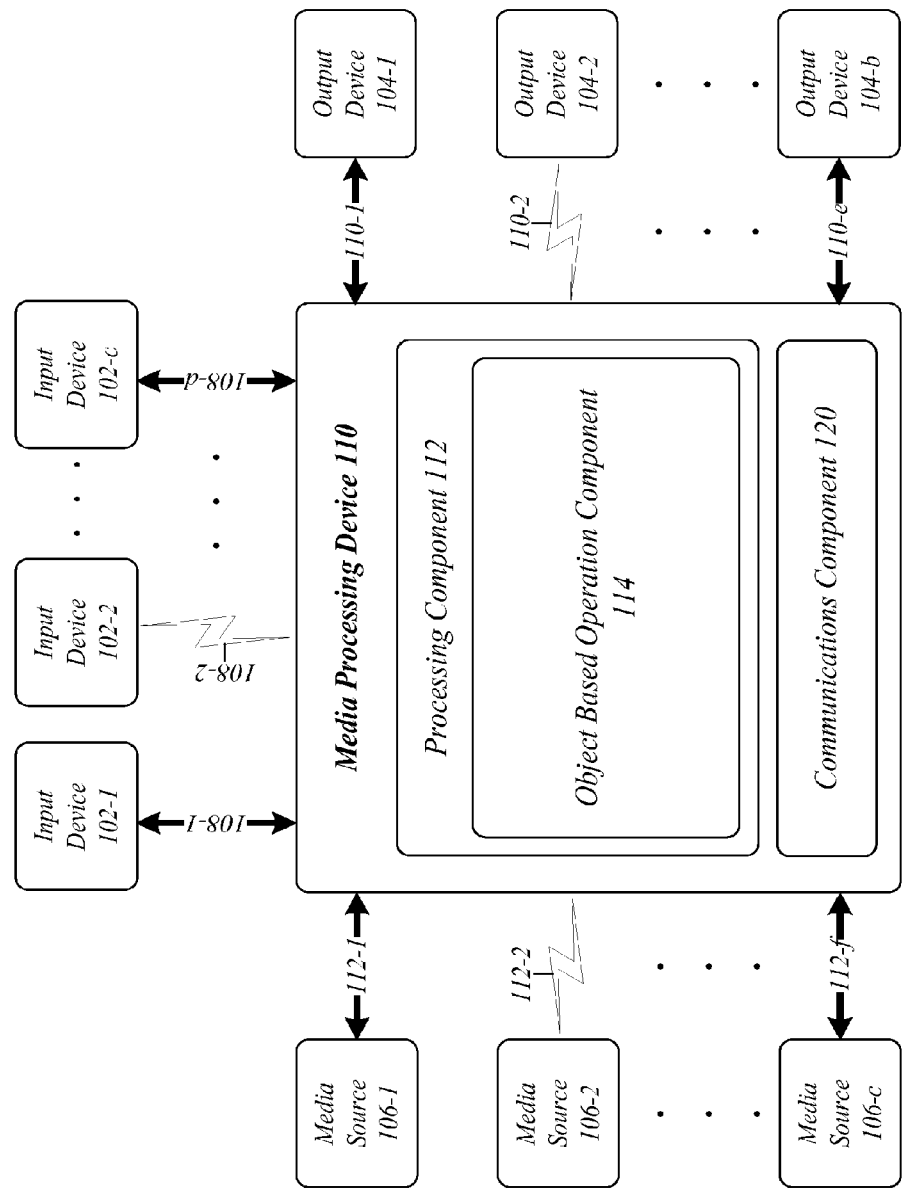
FIG. 1 illustrates one embodiment of a media processing system.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience more interesting, compelling, engaging, and efficient. A unified interface may combine the best aspects of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And from computers, point-and-click mechanisms that allow effective navigation of complex information spaces may also be part of the unified interface of the digital home system in various embodiments.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in a functionally seamless and easily understood manner.

The digital home system may include, in various embodiments, a multi-axis integrated on-screen navigation allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output device may also be incorporated into the digital home system in various embodiments to further enhance the intuitive user interactions, ease of use and overall quality of the system. The embodiments are not limited in this context.

Various embodiments are directed to techniques for object based operation. One or more objects in a multimedia stream may be identified. The one or more objects may be classified. An operation may be performed based on the classification of the one or more objects. Other embodiments are described and claimed. As a result, the embodiments can improve affordability, scalability, modularity, extendibility, or interoperability for an operator, device or network.

In an embodiment, a user may be watching a multimedia stream on the electronic display in the digital home system. In an embodiment, a multimedia stream may be a movie or a television program via a broadcast station. In an embodiment, the multimedia stream may include one or more video frames. In an embodiment, the multimedia stream may include live feed.

In an embodiment, other entertainment options may be presented on the electronic display along with the multimedia stream. The multimedia stream may have one or more objects that may be identified. The objects may include, but are not limited to, text, graphics, and/or images presented on the display. Other objects may be implemented as well. For example, an object may be the image of a car, house, actor, food and/or subtitles embedded in a multimedia stream. The object may be classified as a replaceable object, a salient object, and/or an information portal object. Based on the classification, an operation may be performed. For example, a car may be classified as an information portal object. The car object may trigger a secondary object to be displayed. The secondary object may include a website about the type of car. The car website may be presented on the display. In an embodiment, an actress's face may be classified as a salient object. As a result, the car website will be position to not occlude the actress's face. In an embodiment, a tree may be classified as a replaceable object. The car website may be positioned to occlude or cover-up the tree object.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing device 110 may further comprise one or more input devices 102-$a$, one or more output devices 104-$b$, and one or more media sources 106-$c$. The media processing device 110 may be communicatively coupled to the input devices 102-$a$, the output devices 104-$b$, and the media sources 106-$c$ via respective wireless or wired communications connections 108-$d$, 110-$e$ and 112-$f$.

It is worthy to note that "a" and "b" and "c" and similar designators as used herein are intended to be variables representing any positive integer. Thus, for example, if an implementation sets a value for a=5, then a complete set of input devices 102-$a$ may include computing devices 102-1, 102-2, 102-3, 102-4 and 102-5. The embodiments are not limited in this context.

While various embodiments refer to input devices 102-$a$ providing information to media processing device 110 and output devices 104-$b$ receiving information from media processing device, it should be understood that one or more of the input devices 102-$a$ and output device 104-$b$ may allow for the exchange of information to and from media processing device 110 via their respectively connections 108-$d$ and 110-$e$. For example, one or more of input devices 102-$a$ may be operative to provide information to media processing device 110 and to receive information from media processing device 110. In various embodiments, one or more of output devices 104-$b$ may be operative to receive information from media processing device 110 and may also be operative to provide information to media processing device 110. Similarly, there may be a bi-directional exchange between the media processing device 110 and media sources 106-$c$. For instance, a media source 106-$c$ may be operative to provide media information to the media processing device 110 and to receive information from the media processing device 110. An example of this would be a video on demand (VOD) application implemented by the media processing device 110. The embodiments are not limited in this context.

In various embodiments, the media processing system 100 may include one or more input devices 102-$a$. In general, each input device 102-$a$ may comprise any component or device capable of providing information to the media processing device 110. Examples of input devices 102-$a$ may include without limitation remote controls, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context.

In various embodiments, the media processing system 100 may include one or more output devices 104-$b$. An output device 104-$b$ may comprise any electronic device capable of reproducing, rendering or presenting media content for consumption by a human being. Examples of output devices 104-$b$ may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

In one embodiment, for example, the media processing system 100 may include a display 104-1. The display 104-1 may comprise any analog or digital display capable of presenting media information received from media sources 106-$c$. The display 104-1 may display the media information at a defined format resolution. In various embodiments, for example, the incoming video signals received from media sources 106-$c$ may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-$c$. Media sources 106-$c$ may comprise any media source capable of sourcing or delivering media information and/or control information to media processing device 110. More particularly, media sources 106-$c$ may comprise any media source capable of sourcing or delivering digital audio and/or video (AV) signals to media processing device 110. Examples of media sources 106-c may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-c may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-c may be internal or external to media processing device 110, depending upon a given implementation. The embodiments are not limited in this context.

In various embodiments, the media processing system 100 may include one or more media processing devices 110. The media processing device 110 may comprise any electronic device arranged to receive, process, manage, and/or present media information received from media sources 106-c. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication media 120 includes wired communications media and wireless communications media, as previously described.

In various embodiments, the media processing device 110 may comprise an object based operation component 114. The object based operation component 114 is shown as part of media processing device 110 for purposes of illustration and not limitation. It should be understood that the object based operation component 114 could be located in other devices, components or nodes of media processing system 100 in various embodiments and still fall within the described embodiments.

Figure 2:
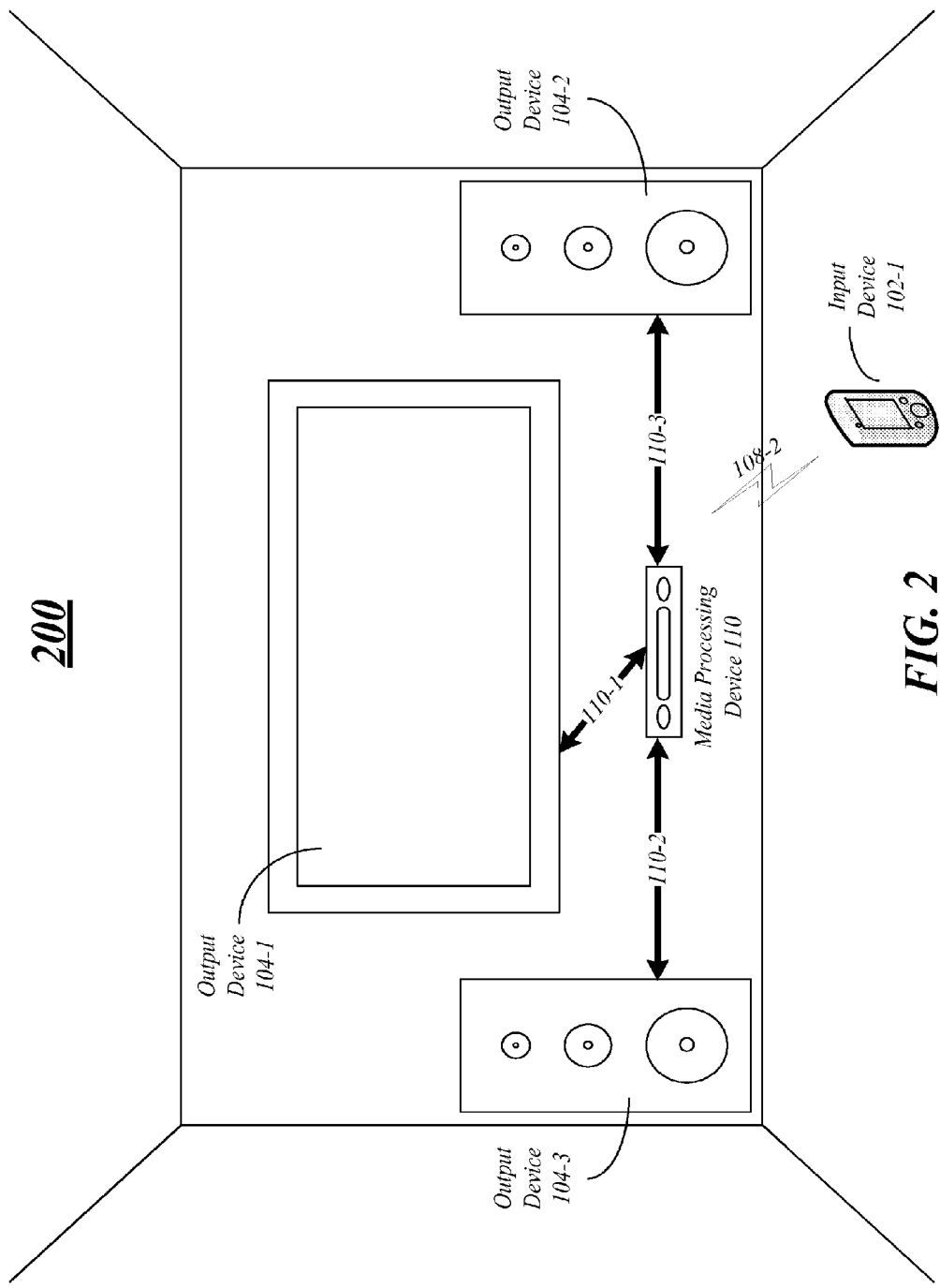
FIG. 2 illustrates one embodiment of a media processing component.

FIG. 2 illustrates a block diagram for a media processing system 200 that may be the same or similar to media processing system 100 of FIG. 1 where like elements are similarly numbered. The media processing system 200 may comprise a sample digital home system implementation that is arranged to provide media content from disparate media sources to viewers in a home, office, or room environment. Although the media processing system 200 shown in FIG. 2 has a limited number of elements in a certain topology, it may be appreciated that the media processing system 200 may include more or less elements in alternate topologies as desired for a given implementation. The embodiments are not limited in this context.

In the illustrated embodiment shown in FIG. 2, the media processing system 200 may comprise a media processing device 110, input device 102-1, output devices 104-1, 104-2 and 104-3, and one or more media sources 106 (not shown). The media processing device 110 may be communicatively coupled to the input device 102-1, the output devices 104-1, 104-2 and 104-3, and the media sources 106 via respective wireless or wired communications connections 108-2, 110-1, 110-2 and 110-3. For purposes of illustration, the one or more media sources 106 of FIG. 2 (not shown) are part of, or integrated into, media processing device 110. Other embodiments are described and claimed.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of output device 104-1 or any other suitable component of system 200 in some embodiments. Output device 104-1 may comprise a digital television arranged to display information received from media processing device 110 over connection 110-1 in some embodiments. In various embodiments, output devices 104-2 and 104-3 may comprise speakers arranged to reproduce audio or other acoustic signals received from media processing device 110 over connections 110-2 and 110-3 respectively. Input device 102-1 may comprise a remote control, smart phone, or other suitable processing device capable of communicating with media processing device 110, output device 104-1 or any other device in the digital home system 200. Together, each of the components, nodes or devices of media processing system 200 may form or comprise one example embodiment of digital home entertainment system. The embodiments are not limited to the type, number or arrangement of components illustrated in FIG. 2.

Figure 3:
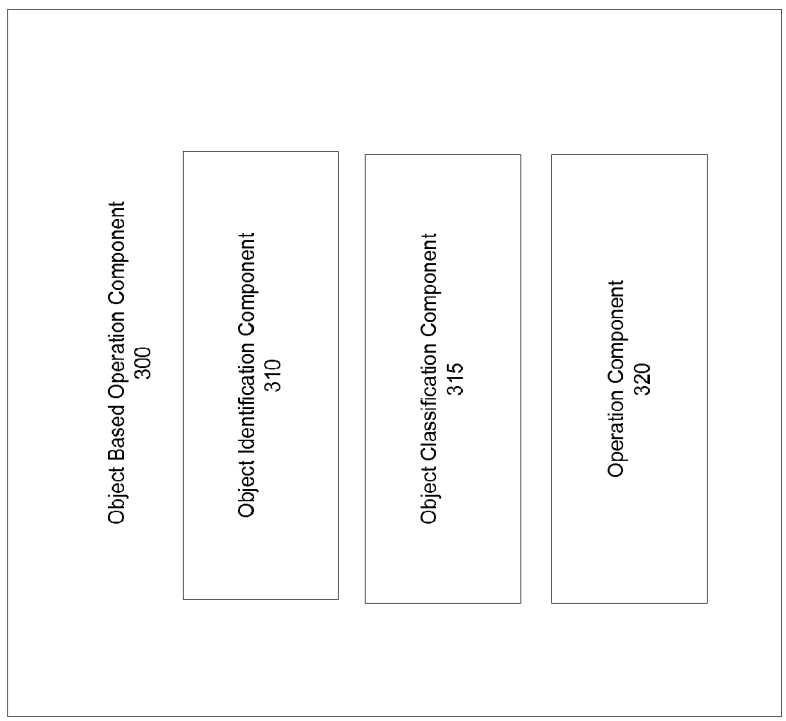
FIG. 3 illustrates an embodiment of an object based operation component.

FIG. 3 illustrates an embodiment of an object based operation component 300. In an embodiment, an object based operation component 300 may include an object identification component 310, an object classification component 315, and an operation component 320.

The object based operation component 300 may create unified access to various forms of entertainment in a visually unobtrusive way. The object based operation component 300 may perform operations based on the objects. For example, the object based operation component 300 may position secondary objects based on the location and classification of the object. By performing operations based on an object from the multimedia stream, a user may obtain information using various forms of media without interruption to the multimedia stream.

The object identification component 310 may determine one or more objects from a multimedia stream. In an embodiment, the multimedia stream may be a live feed. In an embodiment, the objects may be identified from one or more video frames of a multimedia stream.

In an embodiment, an object may be an indigenous object. In an embodiment, an indigenous or original object may be an object that was built into the original content of the multimedia stream by the content originator. In an embodiment, an indigenous object may be embedded in the multimedia stream. For example, an indigenous object may include, but is not limited to, a puck in a hockey game, a face of an actor, a car, a house, a title of a movie or show, and/or movie credits, among other examples. Indigenous objects may also include a ticker at the bottom of one or more frames. For example, the Bloomberg® ticker at the bottom of the frames displaying stocks may be an indigenous object.

In an embodiment, an object may be a non-indigenous object. In an embodiment, a non-indigenous object may have been added by the broadcast station or by a local station. In an embodiment, a digital on-screen graphic, or bug, may be a watermark-like logo added by a broadcast station to identify a television channel. For example, a non-indigenous object may be a recognizable mark or logo, such as, but not limited to, the NBC® peacock and/or the CBS® eye. In an embodiment, the object may be added by a local station. For example, a local station may add a severe weather warning ticker at the bottom of the frames.

In an embodiment, the object identification component 310 may determine the one or more objects using one or more sequential frames from a multimedia stream. In an embodiment, the object identification component 310 may determine an object using, algorithms, rules, pattern recognition, texture recognition, optical content recognition, stereoscopic techniques and/or using a library, among other examples.

In an embodiment, the object identification component 310 may include pattern recognition. In an embodiment, the object identification component 310 may use a pattern matching algorithm to identify an image in a frame as an object. The object identification component 310 may use the pattern matching algorithm to determine whether an image appears in one or more sequential frames. In an embodiment, an image may follow a predictable trajectory. For example, a car may move across a screen in a predictable trajectory that may be determined by the pattern matching algorithm.

In an embodiment, the object identification component 310 may determine an object by locating an image in one or more sequential frames. The object identification component 310 may match that image to a reference image in a library of images.

The object identification component 310 may include a mathematical calculation to determine the object using multiple sequential frames of the multimedia stream. In an embodiment, the mathematical calculation may be used for frame-to-frame object detection. In an embodiment, the mathematical calculation may include probability and/or statistical analysis. In an embodiment, the mathematical calculation may include one or more human detection algorithms. In an embodiment, the mathematical calculation may determine an object using an integration calculation. By integrating across the frames, the fluctuations of non-static elements may cancel out over time and the persistent elements of an image may dominate the calculation. In an embodiment, the mathematical calculation may use the last 10-60 frames to determine one or more objects. For example, the mathematical calculation may use the last set of frames over 2-5 seconds to determine one or more objects. In an embodiment, the mathematical calculation may create a three dimensional model of an object. In an embodiment, the mathematical calculation may use motion, including periodic motion, to determine one or more objects.

In an embodiment, the object identification component 310 may identify an object via image detection and/or image analysis. In an embodiment, an object may be identified using object character recognition (OCR). In an embodiment, OCR may be used to determine one or more objects in a frame using text for semantic and contextual understating.

In an embodiment, an object may be identified by a user. A user may wish to visually tag or identify an object. For example, a user may identify an image of a tree. In an embodiment, a user may identify an object by user assisted contextualization. For example, a user may identify a car via a pointer and the user may say the word car. The object identification component 310 may then identify that object over multiple frames. The object identification component 310 may identify moving objects by comparing successive frames to determine where the object is located.

In an embodiment, the object identification component 310 may identify an object via stereoscopic techniques. As an object may retain the same shape over multiple frames, stereoscopic techniques may be used to analyze the various camera angles of the frames. The camera angles may be analyzed as different viewpoints of the same object. For example, an image of a car may be determined to be an object via stereoscopic techniques. Even though the car may be moving and in different locations in a set of frames, the shape of the car may remain constant. The various frames with the car may be used by stereoscopic techniques to identify the car as an object.

Figure 4:
FIG. 4 illustrates one embodiment of the object classification component.

FIG. 4 illustrates one embodiment of the object classification component 400. An object classification component 400 may classify the one or more objects. In an embodiment, each type of classification may be associated with one or more rules. The object classification component 400 may include object classifications such as, but not limited to, a replaceable object 405, a salient object 410 and an information portal object 415.

In an embodiment, the object may be classified as a replaceable object 405. A replaceable object is an object that is not needed in the frame. A replaceable object is an object that may be occluded. For example, the credits the end of a movie may be identified as an object. The credits object may be classified as a replaceable object 405. In an embodiment, space above a digital on-screen graphic or bug may be classified as a replaceable object. In an embodiment, the edges of the frames may be replaceable objects. In an embodiment, a replaceable object may be identified in a frame away from the main action presented in the multimedia stream.

A secondary object may be positioned on top of the replaceable object 405. In an embodiment, the secondary object may be positioned to preclude a user from viewing the replaceable object 405. The secondary object may be a form of entertainment, such as, but not limited to, television programs, websites, music, photographs, e-mail, social networking sites, and/or movies. The secondary object may include templates, overlays, text, menus, widgets, and/or graphics. Other secondary objects may be implemented as well. For example, a secondary object may be a menu of future airings of a program. For example, a secondary object may be a website-related to the current programming to be presented. For example, a secondary object may be a new e-mail received.

In an embodiment, the object may be classified as a salient object 410. In an embodiment, the salient object may be an important or critical object. The salient object 410 may be one of meaning. For example, the image of a face of an actor may be classified as a salient object 410. For example, a baseball in a baseball game, a puck in a hockey game, a basketball in a basketball game, a soccer ball in a soccer game and/or a football in a football game, may be classified as a salient objects 410. A salient object 410 may include a news ticker, subtitles and/or inset images.

In an embodiment, the object may be classified as an information portal 415. An information portal object 415 may provide entertainment-related information. The information portal object 415 may provide information about the object itself, the content presented in the multimedia stream and/or other forms of entertainment. For example, the object may be an image of a car during a television show. The object may be classified as an information portal 415 and may trigger a secondary object which provides information about the car, such as, but not limited to, the type of car and/or where a viewer can buy that car. For example, the object may be an image of a piece of jewelry on an actress. The object may be classified as an information portal 415 and a secondary object may be triggered which can provide information about where a viewer can buy that piece of jeweler may be displayed.

In an embodiment, the object may be classified according to viewer preferences. In an embodiment, a viewer preference may be a real time request. In an embodiment, a viewer preference may be a one-time request. In an embodiment, a viewer preference may be an enduring preference. For example, a viewer may have a preference for an indefinite period of time. For example, a viewer may have a preference for a stated period of time such as, but not limited to, one week, two months, and/or a year.

A viewer may express a preference in a variety of ways. In an embodiment, a viewer may express a preference by clicking on a remote, touching a touch screen, gesturing in a particular manner using a gesture recognition system, and/or verbally stating a preference to a speech recognition system, among other examples. For example, a viewer may state a preference to learn more about an object. For example, a viewer may gesture that he/she never wants to view screen credits. The credits may be classified as a replaceable object. For example, a viewer may indicate via a touch screen that he/she wants new e-mails displayed instead of a particular object in the multimedia stream. For example, a viewer may verbally state that he/she always want to see stock tickers. A stock ticker may be classified as a salient object.

In embodiment, the object may be classified via embedded codes in the object, in the frame, and/or in metadata corresponding to a frame. For example, a broadcast station or a local station may embed a code in an object, in a frame or in metadata corresponding to a frame. In an embodiment, the embedded code may include, but is not limited to, a barcode. Other types of codes may be implemented as well. The embedded code may be used by the object classification component 400 to classify the object.

In an embodiment, the object classification component 400 may use the techniques described above to identify and classify the object. For example, OCR may identify a textual object. Based on the type of text, the object may be classified. For example, if the text is a ticker with a thunderstorm warning, the object may be classified as a critical object. If the text is the credits, the object may be classified as a replaceable object.

Referring back to FIG. 3, the operation component 320 may perform an operation based on the classification of the one or more objects. In an embodiment, the operation may organize one or more actions around one or more objects.

In an embodiment, the operation component 320 may perform an operation to present a secondary object. In an embodiment, the operation may be performed with a secondary object based on the classification of the one or more objects. For example, the operation may present a website as a secondary object. In an embodiment, context-driven content may be presented based on the one or more objects. For example, a travel channel may be presented on the electronic display. An operation may be performed which provides information about the travel destination presented on the electronic display. The operation may present an advertisement for a hotel package to the travel destination as a secondary object. In an embodiment, an operation may be performed which presents an airline website on the electronic display with information about the cost of airfare to the destination as the secondary object.

In an embodiment, the operation component 320 may perform an operation to position a secondary object on top of a replaceable object. In an embodiment, the operation may position a secondary object to occlude the replaceable object. For example, a secondary object may be a photograph. The photograph may be positioned to occlude a replaceable object, such as, an unimportant actor in the frames of the multimedia stream.

In an embodiment, the secondary object may be a product placement template. The product placement template may be positioned on top of the replaceable object. The product placement template may be chosen based on the size, positioning and program context. For example, an advertisement for a Hawaii hotel may be displayed to occlude a replaceable object, such as, the bottom of the frame during a television show featuring Hawaii.

In an embodiment, the operation component 320 may perform an operation which occludes a replaceable object with a secondary object with viewer-specific information. For example, the replaceable object may be occluded with information about the temperature in the viewer's location. For example, a traffic update in the viewer's location may be placed at the bottom edge of one or more frames. For example, an operation may provide a clickable e-commerce link tailored to the viewer covering a replaceable object.

In an embodiment, the operation component 320 may perform an operation to present a secondary object that does not preclude a salient object from being presented and viewed by a user or viewer. No secondary object presented on an electronic display may be positioned on top of or covering any part of the salient object. The operation component 320 may perform an operation such that one or more secondary objects are presented around a salient object. For example, a ticker showing stocks may be classified as a salient object so that secondary objects are positioned to not occlude the ticker. For example, subtitles presented on a display may be classified as a salient object to ensure that the words are not occluded by a secondary object.

In an embodiment, an actor's body may be classified as a salient object. The operation component 320 may position a secondary object to not occlude the salient object. In an embodiment, a secondary object may be positioned so that the template does not cover any part of the salient object.

In an embodiment, the operation component 320 may perform an operation to present a secondary object based on the information portal object. The information portal object may trigger a secondary object to be displayed based on the context of the information portal object and/or the multimedia stream. For example, a car may be classified as an information portal object. The car object may trigger a secondary object to be displayed. The secondary object may include a website about the type of car. The car website may be presented on the electronic display.

In an embodiment, the operation component 320 may perform an operation to present a menu as a secondary object. In an embodiment, a menu may at least partially surround an information portal object. In an embodiment, the menu may trigger secondary objects having various forms of entertainment-related actions. In an embodiment, the entertainment-related actions may be media-related actions. In an embodiment, the menu may include, but is not limited to, reviews, purchasing opportunities, discounts, among other entertainment-related options.

In an embodiment, the operation component 320 may perform an operation based on multiple object classifications. For example, an actress may be an information portal object and a salient object. The actress object may trigger a secondary object, such as a website about the actress, to be presented. The website may be positioned so as to not cover any part of the actress from being displayed.

In an embodiment, the operation component 320 may perform an operation based on classifications for multiple objects. For example, a multimedia stream may have one or more frames with a football player. The image of the football player may be classified as an information portal object. The image of the football may be classified as a salient object. An operation may be performed which presents a viewer's fantasy football website. The website may be displayed in a position that does not occlude the football object from being presented on the electronic display. In an embodiment, the frame may include an empty area of the field. The empty area of the field may include an embedded object stating that the empty field object may be a replaceable object. The website may be positioned over the empty field object.

For example, the credits of a movie may be classified as a replaceable object. In an embodiment, an operation may be performed to display advertisements positioned over the credits. In an embodiment, an operation may be performed to display a viewer's new e-mails. The new e-mails may be positioned to preclude a viewer from viewing the credits. In an embodiment, an operation may be performed to provide a website where a viewer can purchase music-related to the movie. The website may be positioned on top of the credits.

In embodiment, the operation component 320 may perform an operation based on code embedded in an object. For example, the embedded code may indicate a type of product placement template based on the content from the multimedia stream. The operation performed may present a product placement template.

Figure 5:
FIG. 5 illustrates one embodiment of an object based operation.

FIG. 5 illustrates one embodiment of an object based operation. In an embodiment, the Martha Stewart Show® 500 may be presented on the electronic display. In an embodiment, one or more objects may be identified. In an embodiment, the image of Martha Stewart's face 505 may be identified as an object. In an embodiment, the image of the food 510 may be identified as an object.

In an embodiment, the image of Martha Stewart's face 505 may be classified as a salient object. In an embodiment, the image of the food 515 may be classified as an information portal.

An operation may be performed based on the classification of the one or more objects. In an embodiment, the image of the food 505 may be classified as an information portal object and the operation to be performed may present Martha Stewart's website 515. In an embodiment, the positioning of the website may be determined based on the salient object, the image of Martha Stewart's face 505. As a salient object may not be covered by a secondary object, Martha Stewart's website 515 may be positioned so that it does not cover any part of the image of Martha Stewarts's face 505.

In an embodiment, the image of the man next to Martha Stewart may be classified as a replaceable object. The website of Martha Stewart 515 may be placed on top of the replaceable object, the image of the man.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may identify one or more objects in a multimedia stream at block 602. For example, the objects may be embedded object in the multimedia stream. The objects may be original objects to the content created by the content originator. For example, the objects may be identified via object character recognition, image analysis and/or stereoscopic techniques, among other techniques.

The logic flow 600 may classify the one or more objects at block 604. For example, an object may be classified as a salient object, a replaceable object and/or an information portal object. A salient object may not be occluded or covered. A salient object may include, but is not limited to, images of a person's face, a ball, a puck, scroll bar, and/or subtitles. A replaceable object may be occluded or covered. An information portal object may be used to provide entertainment-related information. In an embodiment, an object may be classified via a bar code. The embodiments are not limited to this example.

The logic flow 600 may perform an operation with a secondary object based on the classification of the one or more objects at block 606. A secondary object might include, but is not limited to, a template, an overlay, text, menus, widgets and/or graphics, among other embodiments. For example, context-driven content may be presented as the secondary object based on the classification of the one or more objects. In an embodiment, a product placement template may be presented as the secondary object based on the classification of the one or more objects.

In an embodiment, an object may be classified as a replaceable object and a secondary object may be positioned to occlude the replaceable object. In an embodiment, an object may be classified as a replaceable object and a product placement template may be positioned on top of the replaceable object. In an embodiment, an object may be classified as a salient object and a secondary object may be positioned to not occlude the salient object. In an embodiment, an object may be classified as a salient object and a secondary object may be inserted such that the secondary object is not placed over or on top of the salient object. The embodiments are not limited to this example.

Figure 7:
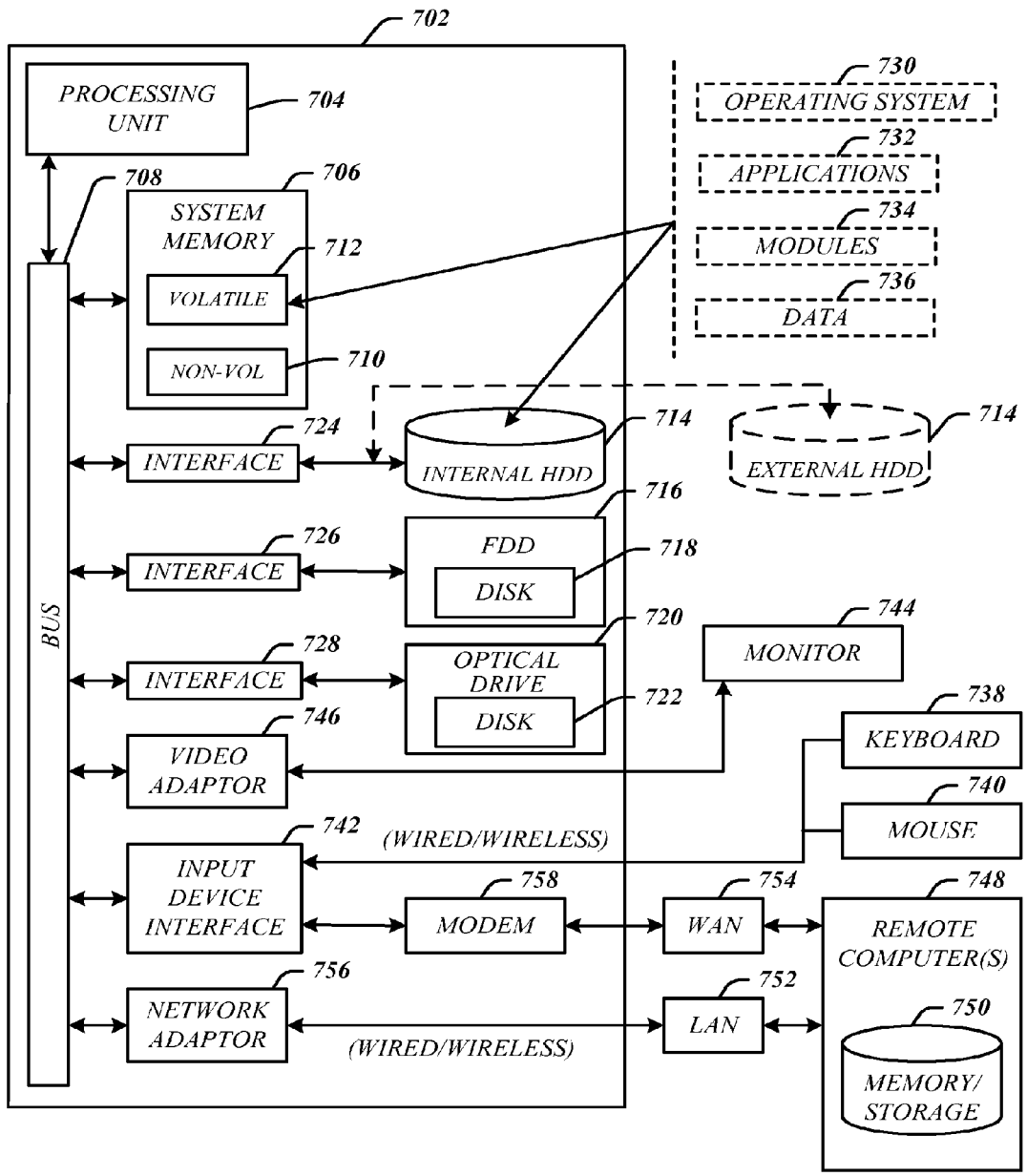
FIG. 7 illustrates one embodiment of a computing architecture.

FIG. 7 illustrates an embodiment of an exemplary computing architecture 700 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 700 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The computing architecture 700 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

The one or more application programs 732, other program modules 734, and program data 736 can include, for example, the object based operation component, the object identification component, the object classification component and the operation component.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
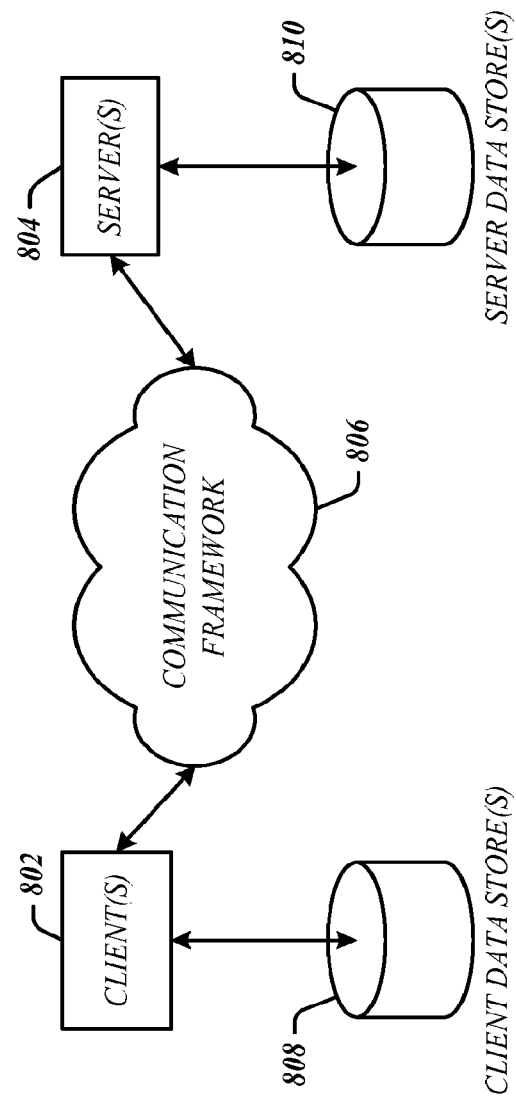
FIG. 8 illustrates one embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 310, 400. The servers 804 may implement the server system 330. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols, such as those described with reference to systems 300, 400 and 700. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An article comprising a non-transitory, computer-readable storage medium containing instructions that when executed enable a system to:
   identify one or more objects in a multimedia stream;
   classify at least one object of the one or more objects as a salient object and at least one other object of the one or more objects as a replaceable object; and
   perform an operation based on the classification of the one or more objects, the operation to position a secondary object to cover-up the replaceable object and to not cover-up the salient object.

2. The article of claim 1, comprising instructions that when executed enable the system to identify the one or more objects embedded in the multimedia stream.

3. The article of claim 1, comprising instructions that when executed enable the system to identify the one or more objects via object character recognition.

4. The article of claim 1, comprising instructions that when executed enable the system to identify the one or more objects via stereoscopic techniques.

5. The article of claim 1, comprising instructions that when executed enable the system to classify at least one of the one or more objects as an information portal object.

6. The article of claim 1, comprising instructions that when executed enable the system to classify the one or more objects via a bar code.

7. The article of claim 1, comprising instructions that when executed enable the system to present a secondary object based on the one or more objects.

8. The article of claim 1, comprising instructions that when executed enable the system to present context-driven content based on the one or more objects.

9. The article of claim 1,
   the secondary object comprising a product placement template.

10. A method comprising:
    identifying one or more objects in a multimedia stream;
    classify at least one object of the one or more objects as a salient object and at least one other object of the one or more objects as a replaceable object; and
    performing an operation with a secondary object based on the classification of the one or more objects, the operation to position the secondary object to cover-up the replaceable object and to not cover-up the salient object.

11. The method of claim 10, comprising
    identifying the one or more objects embedded in the multimedia stream.

12. The method of claim 10, comprising
    identifying the one or more objects via object character recognition.

13. The method of claim 10, comprising
    identifying the one or more objects via stereoscopic techniques.

14. The method of claim 10, comprising
    identifying the one or more objects via image analysis.

15. The method of claim 10, comprising
    identifying the one or more objects via texture recognition.

16. The method of claim 10,
    the salient object comprising images of a person's face, a ball, a puck, or a scroll bar.

17. The method of claim 10, comprising:
    classifying the one or more objects via a bar code.

18. The method of claim 10, comprising:
    presenting a template as the secondary object based on the one or more objects.

19. The method of claim 10, comprising:
    presenting context-driven content as the secondary object based on the one or more objects.

20. The method of claim 10, comprising:
    the secondary object comprising a product placement template.

21. An apparatus, comprising:
    a processing component; and
    a object based operation component operative on the processing component to
    navigate a multimedia stream, the object based operation component comprising:
      an object identification component operative to identify one or more objects in the multimedia stream,
      an object classification component operative to classify at least one object of the one or more objects as a salient object and at least one other object of the one or more objects as a replaceable object; and
      an operation component operative to perform an operation based on the classification of the one or more objects, the operation to position a secondary object to cover-up the replaceable object and to not cover-up the salient object.

22. The apparatus of claim 21, the object classification component operative to classify at least one of the one or more objects as an information portal object.

23. The apparatus of claim 21, the object identification component operative to identify the one or more objects via object character recognition.

24. The apparatus of claim 21, the object identification component operative to identify the one or more objects via stereoscopic techniques.

25. The apparatus of claim 21 comprising:
a digital display on a media processing device.

* * * * *